N. D. HULL.
MEASURING PUMP.
APPLICATION FILED DEC. 20, 1915.

1,291,528.

Patented Jan. 14, 1919.
5 SHEETS—SHEET 3.

WITNESSES:
W. H. Knoche
E. M. Hull.

INVENTOR
Nathaniel D. Hull,
BY
Taylor & Hulse
ATTORNEYS.

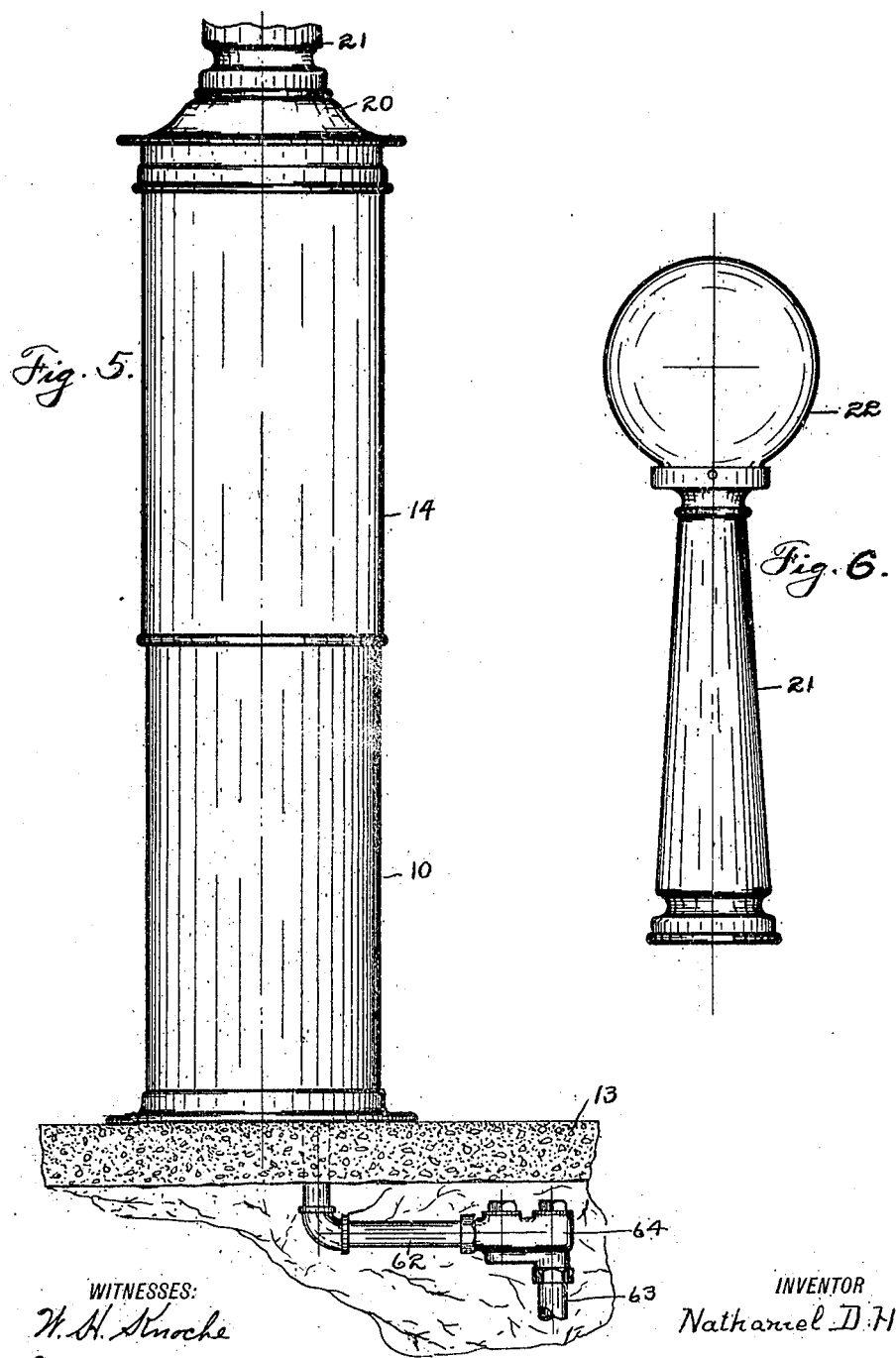

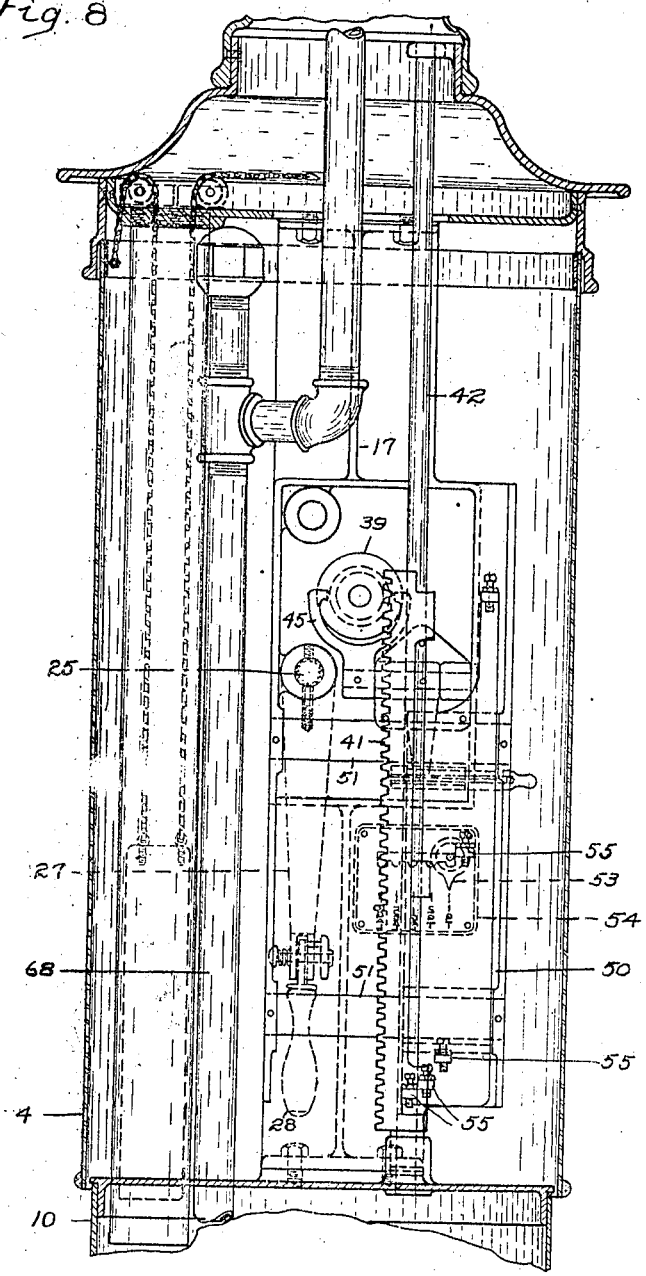

UNITED STATES PATENT OFFICE.

NATHANIEL D. HULL, OF OWENSBORO, KENTUCKY, ASSIGNOR TO HULL PUMP AND TANK COMPANY, OF OWENSBORO, KENTUCKY, A CORPORATION.

MEASURING-PUMP.

1,291,528.  Specification of Letters Patent. Patented Jan. 14, 1919.

Application filed December 20, 1915. Serial No. 67,745.

*To all whom it may concern:*

Be it known that I, NATHANIEL D. HULL, a citizen of the United States, residing at Owensboro, in the county of Daviess and State of Kentucky, have invented new and useful Improvements in Measuring-Pumps, of which the following is a specification.

The invention relates to certain improvements in measuring pumps.

The wide use of the automobile has increased the demand for apparatus by which gasolene and other liquids may be dispensed in measured quantities. In all such devices it is desirable that the mechanism shall be easily operated, and where it is installed out of doors, it is essential that it shall be protected against the weather and be incapable of unauthorized operation. The speed with which a desired quantity of liquid shall be delivered by the device is also an important feature.

The objects of my invention are to provide a pump which shall be rapid in operation and shall accurately measure the fluid discharged by it, the pump having novel driving and measuring mechanisms.

Another object is to provide the pump with a novel and efficient device by which it is locked against unauthorized operation.

Other objects will appear in the detailed description of the embodiment of my invention illustrated in the accompanying drawings, in which drawings—

Fig. 5 is an elevational view of the device with the housing-sections closed and showing the suction pipe.

Fig. 6 is an elevational view of the top of the structure illustrating an ornamental lamp post.

Fig. 7 an elevational view of the double rack and segment gear of the driving mechanism.

Figure 1:
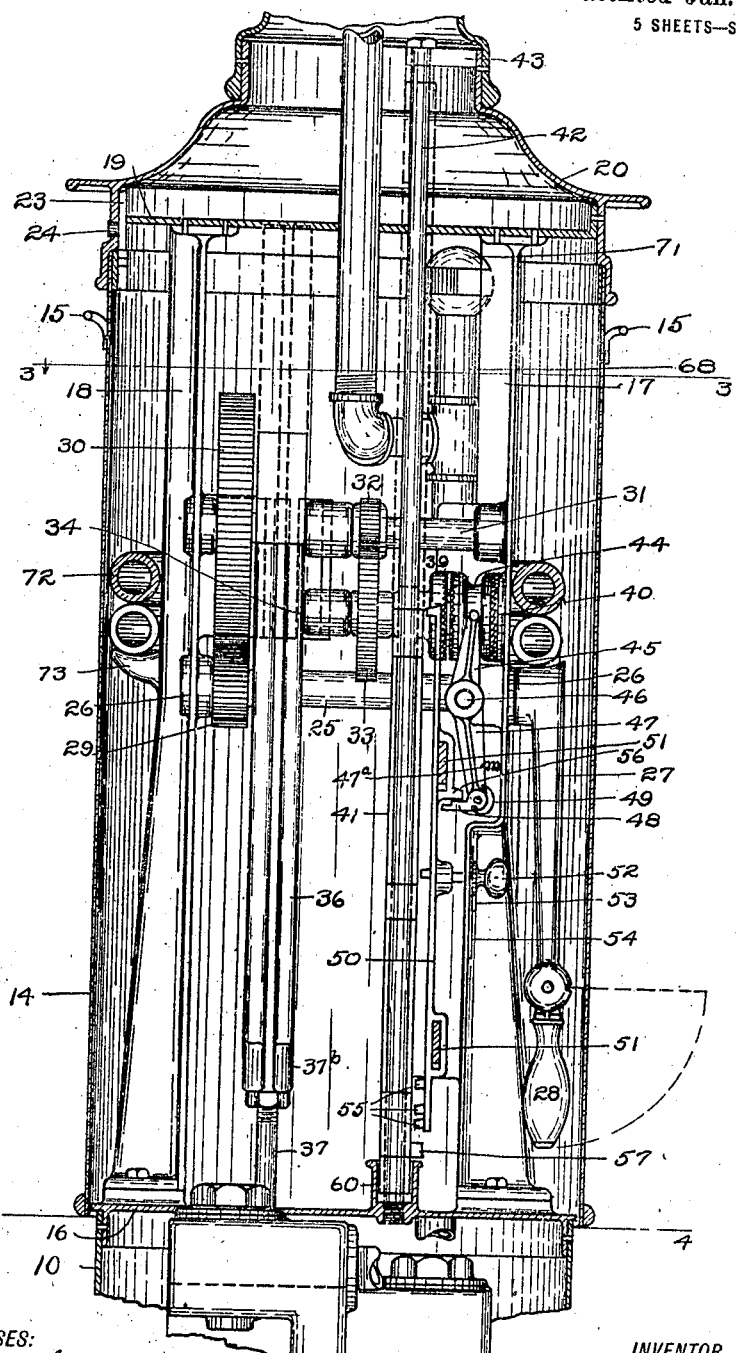
Figure 1 is a vertical section of the upper half of the pump housing illustrating the driving and measuring devices.

Fig. 8 is a central cross-sectional view taken at right angles to the view shown in Fig. 1.

Referring to the drawings the entire mechanism is contained within a telescoping housing, the lower half 10 of which is preferably cast iron and anchored by bolts 11 to the foundation 13, and the upper half 14 of which is preferably formed of suitable sheet metal. The upper housing is provided with suitable handles 15 by which it may be raised and lowered about housing 10.

A plate 16 is secured to housing 10, and standards 17 and 18 are secured at their lower ends to the plate. A plate 19 is secured to the upper ends of the standards and a dome 20 is supported by plate 19. A lamp post 21 with a globe 22 (Fig. 6) may, if desired, be mounted on the dome for electrical illumination or sign purposes.

Upper housing 14 is secured to dome 20 by a suitable bolt 23 which is secured by a suitable lock 24, so that the housing may be securely locked in its closed position. Preferably upper housing 14 will be provided with a counterbalance weight which, in practice, will be attached to the housing by chains which pass over a sheave suitably mounted on a convenient stationary part of the structure.

Crank shaft 25 is suitably supported in bearings 26 which are cast on or secured to standards 17 and 18. Crank 27 is connected to one end of shaft 25 and is provided with a handle 28 which has a swivel connection thereto in order that it may be turned to a vertical position to permit upper housing 14 to clear it when the housing is opened or closed. The broken lines (Fig. 1) indicate the position to which handle 28 is moved for operating the mechanism.

A spur pinion 29 is secured to crank shaft 25 and is in mesh with gear 30 which is attached to shaft 31. An intermediate pinion 32 is also attached to shaft 31 and is in mesh with intermediate gear 33, which gear is mounted on shaft 34. Shafts 31 and 34 are supported in suitable bearings which are cast on or carried by standards 17 and 18.

Figure 3:
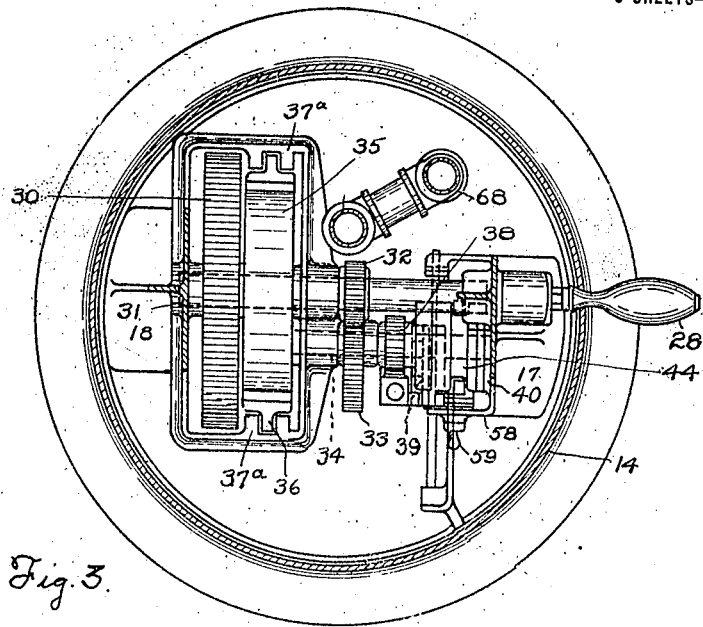
Fig. 3 is a cross-section on line 3—3 of Fig. 1.
Figure 4:
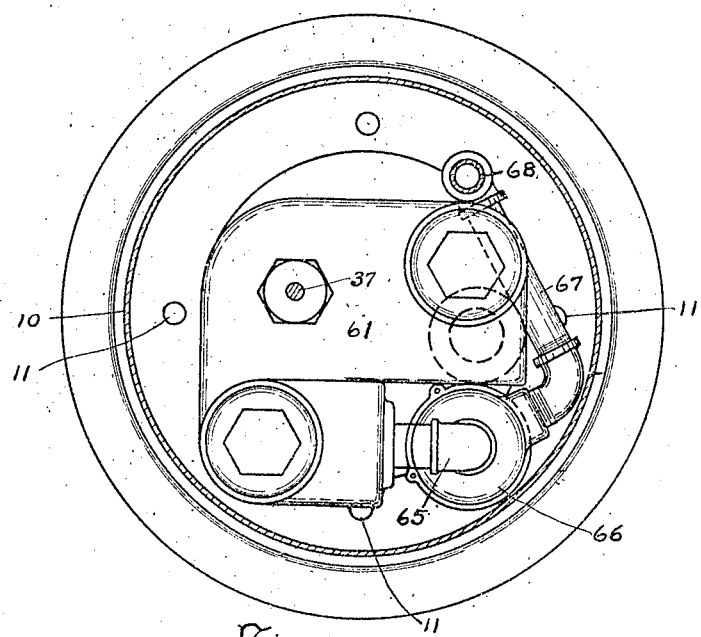
Fig. 4 is a cross-section on line 4—4 of Fig. 1.

A segment gear 35 (Figs. 3 and 7) is secured to shaft 31 and is adapted to mesh with double rack 36 which is vertically slidable in guides 37ª which are provided on standard 18 and which is provided at its lower end with a boss 37ᵇ which is connected to plunger rod 37 (Figs. 1 and 7). By the rotation of shaft 31 segment gear 35 is rotated in the direction of the arrow and the rack is thereby caused to reciprocate in opposite directions with each revolution of the gear.

An idle spur pinion 38 (Fig. 3) is loosely carried by shaft 34 and is attached to a one-half clutch 39 (Fig. 1). Another half clutch 40 is secured to standard 17. Pinion 38 is in mesh with measuring rack 41, which rack is tubular and is guided in its vertical movement by rod 42, which rod is held by lug 43 and threaded, at its lower end into plate 16. A double clutch 44 is slidably but not rotatably mounted on shaft 14 and is adapted to mesh with either half clutch 39 or 40. When it engages the fixed half 40 the pump mechanism is locked and cannot be operated, and when it engages the loose half 39 the mechanism is operative and measuring rack 41 is elevated.

In order that double clutch 44 may be shifted from one clutch 40 to clutch 39 I provide a fork 45 which loosely engages clutch 44 and is pivotally mounted on shaft 46. A lever 47 which is opposed by spring 47$^a$ is also connected to this shaft and to the lower end of the lever is pivoted a lock dog 48, and spring 49, which is connected to both the dog and the lever and tends to elevate the dog on its pivot.

A stop plate 50 is supported on guide bars 51, which bars extend transversely of housing 14 and upon which bars plate 50 may be moved. A knob 52 is attached to plate 50 and is provided with pointer 53 which registers with an indicating plate 54, upon which plate are stamped or otherwise indicated in horizontal alinement the selected quantities of liquid to be measured by the pump, such, for example as one quart, one half gallon, one gallon, etc. On plate 50 are provided stops 55 which are arranged at predetermined points according to the graduations on indicator plate 54. A suitable lug 56 is also provided on plate 50, the forward end of which is adapted to engage in the notched end of dog 48, when clutch 44 is thrown into mesh with loose clutch 39, and thereby maintains the engagement of clutches 39 and 44 until released as is about to be described. At the lower end of rack 41 is a lug or stop 57 which is adapted as the rack is moved upwardly, to meet the selected lug 55 on plate 50 and thereby elevates the plate on its guide bars a sufficient amount to release the connection between dog 48 and lug 56, whereupon clutch 44 will disconnect from loose clutch 39 and connect with clutch 40 and cause the mechanism to become inoperative and to be locked to the said clutch 40.

Shaft 46, to which fork 45 and lever 47 are connected is extended beyond gear housing 58 and is provided with suitable means 59 (Fig. 3) by which the shaft may be rotated by hand to cause clutch 44 to shift into connection with clutch 39, the weight of lever 47 together with spring 47$^a$ being sufficient to break that connection when dog 48 is released as above described. A dash pot 60 is provided on plate 16 which serves as a shock absorber for rack 41, the rack falling by gravity as soon as the engagement of clutches 39 and 44 is broken.

Figure 2:
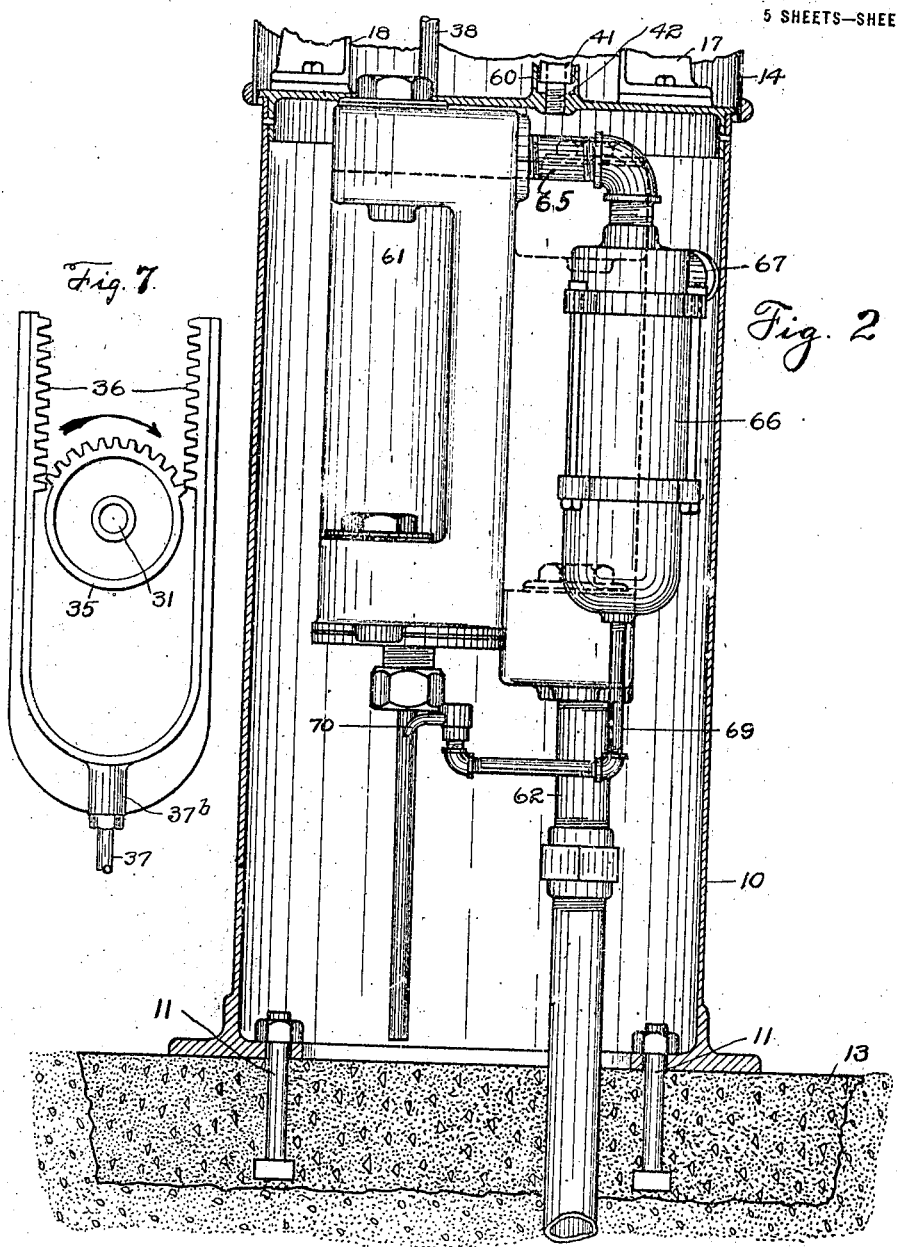
Fig. 2 is a vertical section of the lower half of the pump housing illustrating the pump cylinder and filter.

Plunger rod 37 is connected at its lower end to a suitable piston within cylinder 61 (Fig. 2). The cylinder is of the double acting type. It is supported within and by housing 10. Suction pipe 62 is connected to the lower part of the cylinder and is connected to main suction pipe 63 which is extended down into the storage tank or reservoir which is buried in the ground. A suitable foot valve 64 (Fig. 2) will also be placed in the suction line. Discharge pipe 65 connects cylinder 61 to a suitable strainer 66 and intermediate discharge pipe 67 connects the strainer to main discharge pipe 68 which passes up into housing 14. A drain pipe 69 is provided in the bottom of strainer 66 and is supplied with a drain cock 70 at its outer end.

An air chamber 71 is provided on discharge pipe 68 and a hose 72 is suitably connected to the pipe, which, when not in use may be wrapped about the inner periphery of housing 14, suitable lugs 73 on the standard serving to support the hose.

In operation, the housing having been unlocked and opened by telescoping the upper portion upon the lower portion and the hose having been withdrawn and handle 28 turned to the horizontal position, shaft 46 is rotated to throw clutch 44 into mesh with clutch 39, thereby connecting the measuring rack 41 to the driving mechanism. Indicating needle 53 is adjusted to the selected graduation upon scale 54. Crank 27 is then rotated to revolve the several shafts and gears thereon and segment gear 35 will cause rack 36 to travel up and down to operate the pump and force the liquid in the storage tank in a steady stream through the discharge pipe and hose or other discharge point in said pipe. Measuring rack 41 is at the same time caused by gear 38 to travel upwardly until lug 57 thereon strikes the stop on plate 50 which corresponds to the selected graduation upon the indicator plate 54, whereupon clutch 44 is disconnected from clutch 39 and connected to fixed clutch 40 thereby locking the driving mechanism from further movement. The desired quantity of fluid will be found to have been discharged from the discharge pipe 68 when clutch 44 has been shifted and the pump cannot be again operated until clutch 44 is shifted to clutch 39 as above described.

It will be seen that crank 27 is continuously rotated and that the flow of liquid from the discharge is constant, thereby affording a great saving in time over that required for the operation of all previous measuring pumps of which I am aware. The device is also exceedingly accurate in its measurement of the liquid and may be provided with a large range of predetermined quantity deliveries, after each of which deliveries the device is automatically locked against further operation until it is reset for another delivery of liquid.

What I claim is:

1. The combination with a pump mechanism, of a rack connected to the mechanism, revolubly mounted means to reciprocate the rack, means to predetermine the quantity of liquid to be discharged from the mechanism consisting of a series of adjustable stops and a movable stop having operative connection with the revolubly mounted means and adapted to abut a selected stop and means for automatically locking the revoluble means when the predetermined quantity has been discharged.

2. The combination with a pump mechanism, of a rack connected to the mechanism, revolubly mounted means to reciprocate the rack, means to predetermine the quantity of liquid to be discharged from the mechanism consisting of a series of adjustable stops and a movable stop having operative connection with the revolubly mounted means and adapted to abut a selected stop and means for automatically locking the revoluble means comprising a clutch mechanism having connection with the revoluble means and adapted to be held by the predetermining means in position for rendering the pump operating means effectual and to be released thereby when the predetermined quantity has been discharged.

3. The combination, with a pump mechanism, of a revoluble shaft having connection with the pump mechanism, a reciprocable rack, a fixed clutch member, a loose pinion on the shaft and engaging the rack, shifting means secured to the shaft and normally engaging the fixed clutch and adapted to be connected to the loose pinion, means to lock the shifting means and shaft to the loose pinion, and means on the rack adapted to engage the locking means selectively for releasing the engagement of the shifting means and the loose pinion whereupon the shifting means automatically engages the fixed clutch and locks the shaft to said clutch.

4. The combination with a double acting pump mechanism, a continuously revoluble driving shaft connected to the mechanism, a driven shaft having connection with the driving shaft, a fixed clutch member, a loose clutch member on the driven shaft, a clutch slidably connected to the driven shaft and adapted to be connected to either the fixed clutch or the loose clutch, means to shift the slidable clutch into engagement with the loose clutch, an adjustable stop carrier having stops thereon adapted to lock the slidable clutch into engagement with the loose clutch and movable means driven by the driven shaft when the loose clutch is engaged by the slidable clutch and adapted to abut a selected stop on the stop carrier for releasing the sliding clutch, whereupon the latter is automatically engaged with the fixed clutch for locking the shafts.

5. The combination, with a pump mechanism, of a driven shaft having connection with the pump mechanism, a fixed clutch member, a loose clutch-gear, a reciprocable rack engaging the clutch-gear, a shifting clutch having connection with the shaft and adapted to be connected with either the fixed clutch or the clutch-gear, a lever having connection with the shifting-clutch, a member carrying a plurality of stops and adapted to engage the lever and maintain the connection between the loose gear clutch and the shifting-clutch and means on the rack adapted to engage a selected stop on the member for releasing the lever whereupon the shifting clutch automatically disconnects from the loose gear clutch and engages the fixed clutch.

6. The combination with a pump mechanism of a revoluble shaft having driving connection with the pump mechanism, a second revoluble shaft having connection with the first named shaft, a loose pinion on the second shaft, a reciprocable rack engaging the pinion, a fixed clutch, means to connect the latter shaft to either the loose pinion or the fixed clutch, a member having a plurality of stops thereon and adapted to releasably engage the said means for locking the same to the loose pinion, and a stop on the rack adapted, as the rack is reciprocated, to abut a selected stop on the member upon the completion of a predetermined number of revolutions of the shaft for releasing the engagement of the member and said means whereupon said means disconnects the second shaft and the pinion and connects said shaft to the fixed clutch.

7. The combination with a pump mechanism and means to drive it, of a revoluble shaft driven by said means, a rack, a loose pinion on the shaft and engaging the rack, a fixed clutch, a shifting-clutch on the shaft normally engaging the fixed clutch and adapted to be manually shifted into engagement with the loose pinion, a lever connected to the shifting-clutch, a scale graduated to indicate quantities of liquid to be pumped, an adjustable stop carrier having stops thereon arranged to correspond to the graduations on the scale, and having means to engage the lever for locking the shifting-clutch to the pinion, and a stop on the rack adapted to abut a selected stop on the member as the rack is reciprocated for releasing said member from the lever, whereupon the shifting member is automatically disengaged from the loose pinion and locks the shaft to the fixed clutch.

8. The combination with a double acting pump mechanism and a driving shaft connected thereto, of a driven shaft having connection with the driving shaft, a fixed clutch, a rack and pinion adapted to be connected to the driven shaft, means to connect the latter shaft to either the fixed clutch or the rack and pinion, a movable selective stop carrier adapted to engage the latter means for locking the same to the rack and pinion, and a stop on the rack adapted to disengage the stop carrier from said means upon the completion of a selected number of revolutions of the shafts, whereupon the said means automatically disengages from the rack and pinion and engages the fixed clutch for locking the shafts.

9. The combination with a double acting pump cylinder, a double rack connected to the cylinder plunger, a segment-gear adapted to reciprocate the rack and plunger, revoluble means having a connection to the segment-gear, a fixed clutch, an idler clutch-pinion, shifting means to lock the revoluble means to either the fixed clutch or the clutch pinion, a selective stop-carrier adapted to hold the shifting means in engagement with the clutch-pinion, and means driven by the clutch-pinion adapted to engage a selected stop on the stop-carrier for releasing the shifting means, whereupon the shifting means automatically disengages from the clutch pinion and engages the fixed clutch for locking the revoluble means.

In witness whereof I hereunto subscribe my name this 14" day of December, 1915.

NATHANIEL D. HULL.